United States Patent
Tracadas (10) Patent No.: US 9,927,542 B2
(45) Date of Patent: Mar. 27, 2018

(54) REMOVING RING DOWN EFFECTS FROM SONIC WAVEFORMS

(71) Applicant: HALLIBURTON ENERGY SERVICES, INC., Houston, TX (US)

(72) Inventor: Philip William Tracadas, Houston, TX (US)

(73) Assignee: HALLIBURTON ENERGY SERVICES, INC., Houston, TX (US)

(*) Notice: Subject to any disclaimer, the term of this patent is extended or adjusted under 35 U.S.C. 154(b) by 2 days.

(21) Appl. No.: 14/771,773

(22) PCT Filed: Feb. 28, 2014

(86) PCT No.: PCT/US2014/019696
§ 371 (c)(1),
(2) Date: Aug. 31, 2015

(87) PCT Pub. No.: WO2014/137844
PCT Pub. Date: Sep. 12, 2014

(65) Prior Publication Data
US 2016/0018549 A1 Jan. 21, 2016

Related U.S. Application Data

(60) Provisional application No. 61/774,700, filed on Mar. 8, 2013.

(51) Int. Cl.
*G01V 1/48* (2006.01)
*E21B 47/00* (2012.01)

(52) U.S. Cl.
CPC .......... *G01V 1/48* (2013.01); *E21B 47/0005* (2013.01); *G01V 2210/32* (2013.01); *G01V 2210/324* (2013.01); *G01V 2210/3246* (2013.01)

(58) Field of Classification Search
CPC ............ G01V 1/48; G01V 2210/3246; G01V 2210/324; G01V 2210/32; E21B 47/0005
(Continued)

(56) References Cited

U.S. PATENT DOCUMENTS

| 3,369,626 A * | 2/1968 | Zemanek, Jr. | ...... E21B 47/0002 346/33 WL |
|---|---|---|---|
| 4,210,967 A | 7/1980 | Ingram | |

(Continued)

FOREIGN PATENT DOCUMENTS

| WO | 1993/004383 | 3/1993 |
| WO | 2014/137844 | 9/2014 |

OTHER PUBLICATIONS

PCT International Search Report and Written Opinion, dated Jun. 13, 2014, Appl No. PCT/US2014/019696, "Systems and Methods Providing Ring Down Removal from Sonic Waveforms," Filed Feb. 28, 2014, 13 pgs.

(Continued)

*Primary Examiner* — Daniel L Murphy
(74) *Attorney, Agent, or Firm* — Gilliam IP PLLC (57) ABSTRACT

An illustrative acoustic range finding method including deploying a tool downhole, transmitting a first acoustic waveform with a transmitting acoustic transducer of the tool, receiving a second acoustic waveform with a receiving acoustic transducer of the tool, removing a deterministic waveform from the second acoustic waveform to obtain an echo waveform, and deriving a measurement from said echo waveform.

20 Claims, 5 Drawing Sheets

(58) Field of Classification Search
USPC .................................................. 367/25, 35
See application file for complete search history.

(56) References Cited

U.S. PATENT DOCUMENTS

| | | | |
|---|---|---|---|
| 5,469,736 A * | 11/1995 | Moake | G01B 17/00 166/254.2 |
| 6,538,958 B1 | 3/2003 | Blankinship et al. | |
| 8,634,272 B2 | 1/2014 | Steinsiek et al. | |
| 2004/0122595 A1 | 6/2004 | Valero | |
| 2010/0265796 A1 | 10/2010 | Steinsiek et al. | |
| 2011/0073368 A1 | 3/2011 | Han et al. | |
| 2012/0069705 A1 | 3/2012 | Zhao | |

OTHER PUBLICATIONS

RU Office Action, dated Nov. 7, 2016, Appl No. 2015134848, "Removing Ring Down Effects from Sonic Waveforms," Filed Feb. 28, 2014, 10 pgs.

EP Extended Search Report, dated Jul. 28, 2016, Appl No. 14760047.2, "Removing Ring Down Effects from Sonic Waveforms," Filed Feb. 28, 2014, 7 pgs.

PCT International Preliminary Report on Patentability, dated Nov. 17, 2015, Appl No. PCT/US2014/019696, "Systems and Methods Providing Ring Down Removal from Sonic Waveforms," Filed Feb. 28, 2014, 10 pgs.

* cited by examiner

FIG. 8 though only one is required. The first three of these are LWD tools, the last is a wireline tool.

REMOVING RING DOWN EFFECTS FROM SONIC WAVEFORMS

CROSS-REFERENCE TO RELATED APPLICATIONS

This application claims priority to Provisional U.S. Application 61/774,700, titled "Systems and Methods Providing Ring Down Removal from Sonic Waveforms" and filed Mar. 8, 2013 by P. Tracadas, which is hereby incorporated herein by reference.

BACKGROUND

Oilfield operators demand access to a great quantity of information regarding the conditions encountered downhole. Such information typically includes characteristics of the earth formations traversed by the borehole and data relating to the size and configuration of the borehole itself. The collection of information relating to conditions downhole, which commonly is referred to as "logging," can be performed by several methods including "logging while drilling" (LWD) and wireline logging.

Among the available wireline and LWD tools are a variety of acoustic logging tools including, in particular, ultrasonic "caliper" tools. Such tools employ acoustic signals to perform measurements, for example, measuring a distance to the borehole wall. With an appropriate set of such distance measurements, the borehole size and shape can be estimated, as well as the relative position of the tool within the borehole.

Acoustic transducers face many performance challenges including the "ring down" phenomena due to the transducer's mechanical motion failing to instantly cease when a driver signal is removed. Rather, there is some residual motion and vibration which must be suppressed or otherwise accounted for. This phenomena may be reduced by use of improved transducers, however, such may prove costly when compared to off-the-shelf transducers currently available and used.

BRIEF DESCRIPTION OF THE DRAWINGS

Accordingly, there are disclosed herein methods for removal of deterministic noise from acoustic waveforms, and associated systems. In the drawings.

It should be understood, however, that the specific embodiments given in the drawings and detailed description thereto do not limit the disclosure. On the contrary, they provide the foundation for one of ordinary skill to discern the alternative forms, equivalents, and modifications that are encompassed together with one or more of the given embodiments in the scope of the appended claims.

DETAILED DESCRIPTION

Disclosed herein are systems and tools, along with associated methods, providing removal of a deterministic noise waveform or undesirable interference waveform when using ultrasonic transducers. Such noise may be a ring down waveform or noise conveyed between transducers through the tool body. Illustrative transducers are present in commercially available instruments including Halliburton's XBAT Caliper Log ("XCAL") tool, AcoustiCaliper ("ACAL") tool, Pinger Caliper ("PCAL"—part of the Azimuthal Litho Density tool) sensor, and Circumferential Acoustic Scanning Tool ("CAST"). (The first three of these are LWD tools, the last is a wireline tool.). If such transducers are exposed to extreme conditions, degrade over time, or have only a nominal quality to begin with, they can experience variable or long ring down characteristics. Such ring down characteristics may interfere with acoustic waveform measurements, reducing instrument sensitivity and commensurate detectability of the return echo(s).

At least some of the disclosed systems operate by learning the deterministic waveform and subtracting it from the acquired waveforms, thereby resulting in a waveform only containing a true "echo" reflected from the borehole wall or formation. In some embodiments, the acoustic transducer's deterministic waveform may be learned by statistical analysis of other waveforms near in time to the presently measured waveform. In other embodiments, the deterministic waveform may be learned via previously acquired waveforms now stored in memory, or through predictive waveforms developed in laboratory testing conditions similar to those experienced downhole. Such methods advantageously allow presently used and off-the-shelf components to continue being used, but with increased accuracy and reliability.

Figure 1:
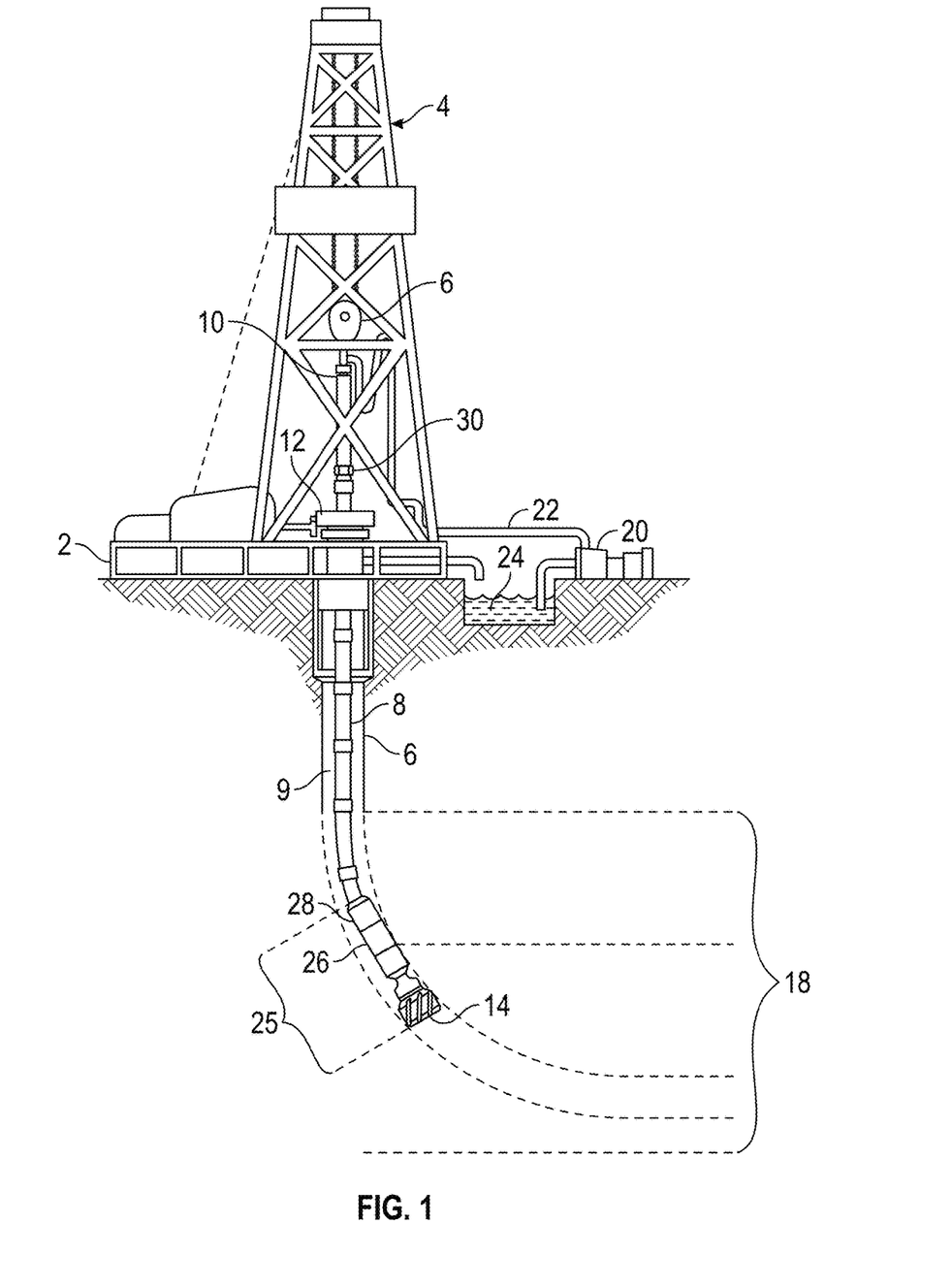
FIG. 1 shows an illustrative environment for logging while drilling ("LWD").

FIG. 1 shows an illustrative LWD environment. In FIG. 1, a drilling platform 2 supports a derrick 4 having a traveling block 6 for raising and lowering a drill string 8. A drill string kelly 10 supports the rest of the drill string 8 as it is lowered through a rotary table 12. The rotary table 12 rotates the drill string 8, thereby turning a drill bit 14. As the drill bit 14 rotates, it creates a borehole 16 that passes through various formations 18. A pump 20 circulates drilling fluid through a feed pipe 22 to the kelly 10, downhole through the interior of drill string 8, through orifices in the drill bit 14, back to the surface via the annulus 9 around the drill string 8, and into a retention pit 24. The drilling fluid transports cuttings from the borehole 16 into the pit 24 and aids in maintaining the integrity of the borehole 16.

The drill bit 14 is just one piece of an open-hole LWD assembly that includes one or more drill collars 26 and logging tool 28. Drill collars 26 are thick-walled steel pipe sections that provide weight and rigidity for the drilling process. The logging tool 28 (which may be built into one of the drill collars) gathers measurements of various drilling or formation parameters. Without limitation, logging tool 28 may be integrated into the bottom-hole assembly 25 near the bit 14 to collect measurements. The collected measurements may be plotted and used for steering the drill string 8 and/or to analyze formation properties. In accordance with at least some embodiments, the logging tool 28 corresponds to an acoustic logging tool with one or more high-purity acoustic transmitters as described herein.

Measurements from the logging tool 28 can be acquired by a telemetry sub (e.g., integrated with logging tool 28) to be stored in internal memory and/or communicated to the surface via a communications link. Mud pulse telemetry is one common technique for providing a communications link for transferring logging measurements to a surface receiver 30 and for receiving commands from the surface, but other telemetry techniques can also be used. In accordance with at least some embodiments, measurements collected from the logging tool 28 are processed by a computer system to produce one or more well logs for analysis by a user. The contemplated logs include acoustic logging measurements such as the propagation velocities of compressional and shear waves, the received waveforms, and derivable values such as acoustic impedance.

Figure 2:
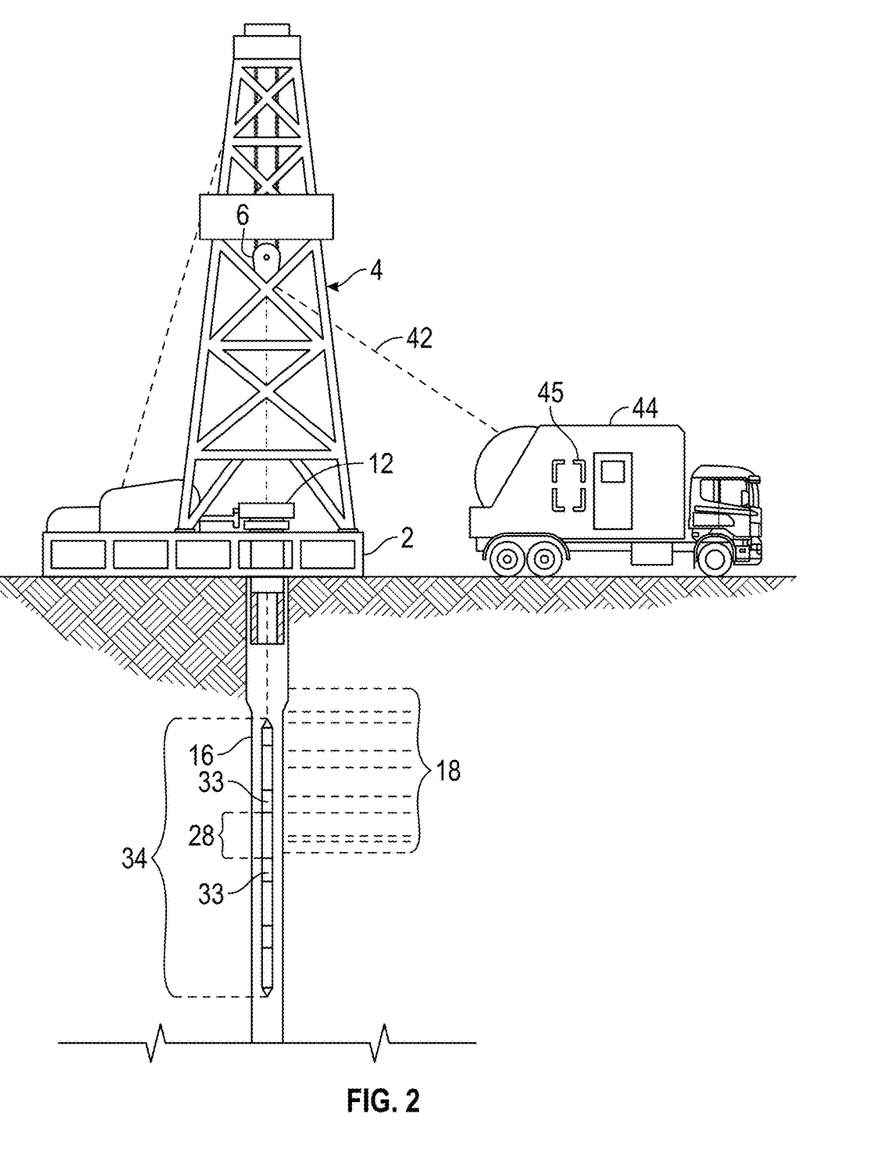
FIG. 2 shows an illustrative environment for wireline logging.

At various times during the drilling process, the drill string 8 may be removed from the borehole 16 as shown in FIG. 2. Once the drill string has been removed, logging operations can be conducted using a wireline logging sonde 34 suspended by a cable 42 having conductors for transporting power to the logging sonde 34 and telemetry from the logging sonde 34 to the surface. In some embodiments, the logging sonde 34 may have pads and/or centralizing members to maintain the tool near the axis of the borehole as the tool is pulled uphole.

It should be noted that various types of formation property sensors can be included with the wireline logging string 34. As shown, the illustrative wireline logging string 34 includes logging tool 28, which may collect acoustic logging data as described herein. The logging tool 28 may be coupled to other modules of the wireline logging string 34 by one or more adaptors 33. A logging facility 44 collects measurements from the logging sonde 34, and includes a computer system 45 for processing and storing the measurements gathered by the sensors. Among other things, the computer system 45 may include a non-transitory computer-readable medium (e.g., a hard-disk drive and/or memory) capable of executing instructions to perform such tasks. In addition to collecting and processing measurements, the computer system 45 may be capable of controlling the logging string 34 and logging tool 28. The logging facility 44 may further include a user interface (not shown) which displays the measurements, for example, a monitor or printer.

Figure 3:
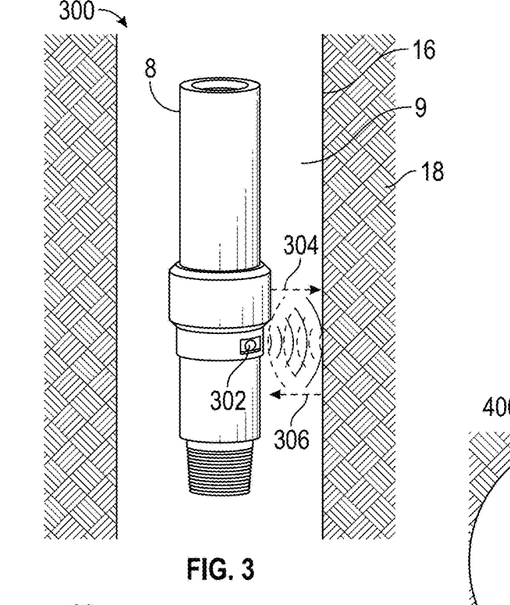
FIG. 3 shows an illustrative acoustic wave generation and measurement tool having a single acoustic transducer.

FIG. 3 shows an illustrative acoustic wave generation and measurement tool 300 (hereinafter "tool 300") having a single acoustic transducer 302. The tool 300 may be similar to the logging tool 28 of FIGS. 1 and 2, thus being part of the drill string 8 (or logging string 34) conveyed downhole within the borehole 16. The acoustic transducer 302 transmits and receives acoustic waveforms to provide caliper measurements. For example, the acoustic transducer 302 may be comprised of a piezoelectric transducer. Upon operation, the acoustic transducer 302 transmits a first acoustic waveform or interrogation waveform 304 towards the borehole 16 wall. Upon interacting with the borehole 16 wall, a second acoustic waveform or return waveform 306 is generated back in the direction of the tool 300 due to acoustic mismatches between the borehole fluid within the annulus 9 and the borehole 16 wall.

The mechanical motion of the acoustic transducer 302 does not instantly cease when a driver signal is removed, thus the acoustic transducer 302 may measure remnants of the interrogation waveform 304 being generated while at the same time recording the reflected return waveform 306, also known as a "ring down" phenomena. This phenomena can be accounted for through implementation of the various methods discussed herein.

Figure 4A:
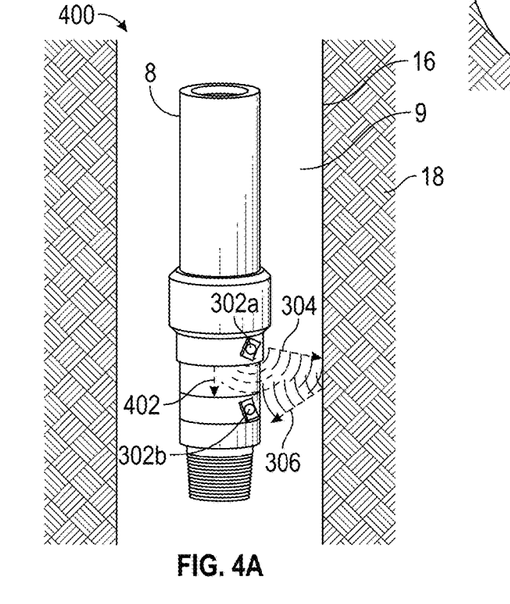
FIGS. 4A and 4B shows an illustrative acoustic wave generation and measurement tool having two acoustic transducers.
Figure 4B:
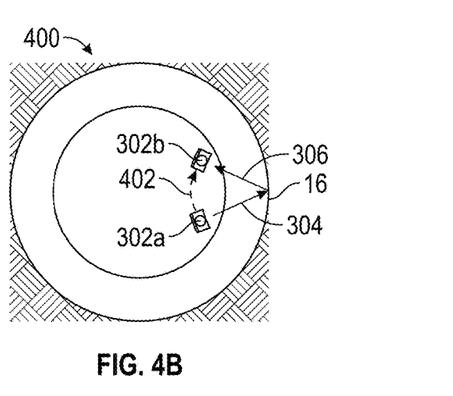

FIGS. 4A and 4B shows another illustrative acoustic wave generation and measurement tool 400 (hereinafter "tool 400"). In FIG. 4A, the tool 400 may be substantially similar to the tool 300 and therefore may be best understood with reference thereto, where like numerals represent like elements that will not be described again in detail. However, as compared to the tool 300 which depicts a single acoustic transducer 302, the tool 400 depicts two acoustic transducers (shown as a first and second acoustic transducer, 302a and 302b) within the same tool 400.

The first acoustic transducer 302a transmits the interrogation waveform 304 towards the borehole 16 wall which reflects as the return waveform 306 towards the second or receiving acoustic transducer 302b. Due to at least a portion of the interrogation signal also being transmitted through the tool 400 (depicted as a third acoustic waveform 402), an undesirable deterministic waveform is present when the second (receiving) acoustic transducer 302b receives the reflected return waveform 306. Again, this phenomena can be accounted for through implementation of the various methods discussed herein.

In some embodiments, such as FIG. 4A, the first and second acoustic transducers 302a and 302b may be vertically aligned on the tool 400. However, it will be appreciated that the acoustic transducers 302a,b may alternatively be azimuthally offset from each other with respect to the center of the tool 400, such as depicted in the top-down view of FIG. 4B.

Figure 5:
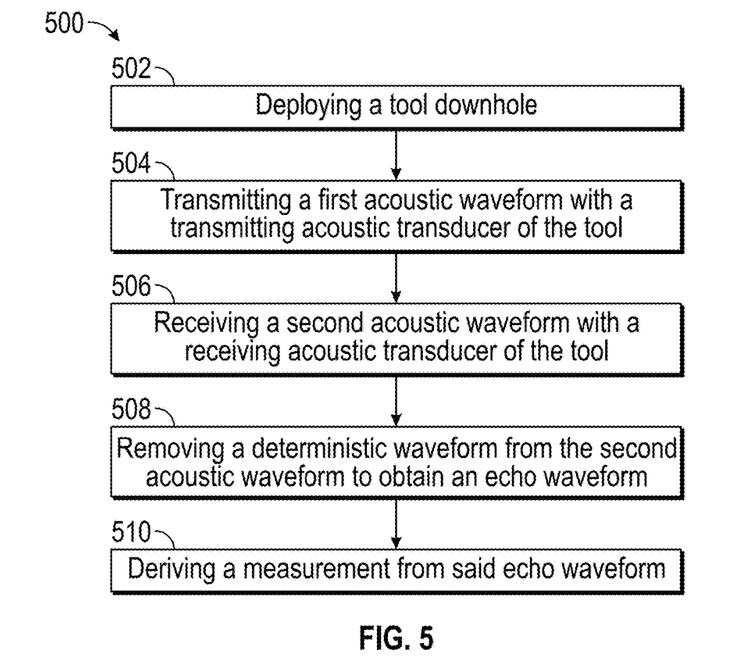
FIG. 5 shows a flowchart of an illustrative deterministic noise waveform removal method.

FIG. 5 shows a flowchart of an illustrative deterministic noise waveform (hereinafter "deterministic waveform") removal method. The deterministic waveform is a noise or undesirable interference waveform advantageously removed, leaving only a true "echo" waveform as described herein. At step 502, a logging crew deploys a tool downhole. The tool may be deployed in a LWD or wireline environment. The tool transmits a first acoustic waveform with a transmitting acoustic transducer of the tool at step 504. The first acoustic waveform is generated towards a borehole wall, wherein a portion is reflected back towards the tool as a second acoustic waveform. At step 506, the tool may receive the second acoustic waveform with a receiving acoustic transducer. In some embodiments, a single acoustic transducer may be implemented as both the transmitting and receiving transducer.

At step 508, a deterministic noise waveform may be identified and removed from the second acoustic waveform to obtain the echo waveform. This operation may be performed by a processor arranged downhole (e.g., in the tool), or alternatively by a processor at the surface (e.g., the computer system 45 within the logging facility 44 (FIG. 1)) during post-processing of the data.

The deterministic waveform may be identified due to its deterministic nature as compared to the actual echo waveform. The deterministic may be present as a "ring down" signal when a single acoustic transducer is implemented as the transmitting and receiving transducer. Alternatively the deterministic noise may be present due to a waveform conveyed between transducers through the tool body.

Figure 6:
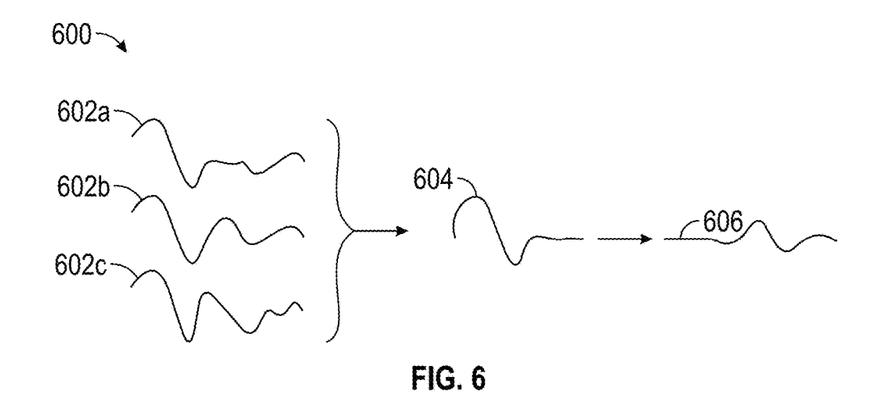
FIG. 6 shows a workflow diagram with certain illustrative waveforms.
Figure 7:
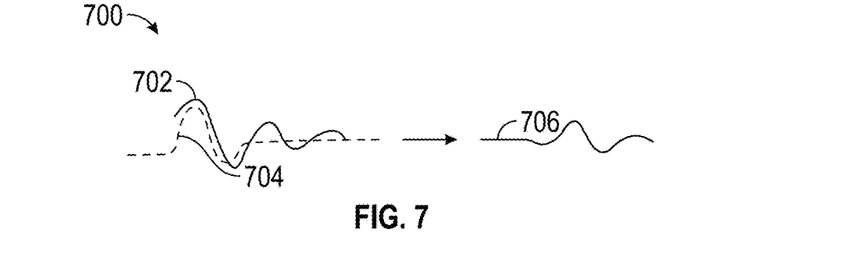
FIG. 7 shows another workflow diagram with certain illustrative waveforms.

In some embodiments, as detailed in FIGS. 6 and 7, identification of the deterministic waveform may be accomplished by performing a statistical analysis of other waveforms acquired in a time window surrounding the acquisition time of the second acoustic waveform. After identification, the deterministic waveform may then be subtracted from the second acoustic waveform to leave only the true "echo" waveform.

In other embodiments, the deterministic waveform may be removed by subtracting previously-recorded waveforms saved in memory of the tool from the currently acquired waveform. Alternatively, a model or lab experiment may be used to generate a predictive deterministic waveform to be removed from the currently acquired waveform.

In further embodiments, the deterministic waveform may be identified by a statistical analysis of the second acoustic waveforms collected in the time window. Such analysis may include, for example, a statistical low pass filter, such as a mean or median filter, whereby the filter is applied across the common sample domain to find the common deterministic waveform signature. Upon finding the deterministic waveform, it may then be removed from the second acquired waveform, thereby leaving only the true echo waveform.

Alternatively, a frequency transform or other type of transform may be applied to the acquired waveform to identify the deterministic waveform. The deterministic waveform is assumed constant, while the true echo waveform varies in time and character between acquired waveforms. Therefore, the deterministic waveform may be identified by transforming the acquired waveform into a domain other than the time domain (e.g., the frequency domain) to determine the deterministic waveform. Upon making such a determination, the acquired waveform may be transformed back into the time domain and removed from the acquired waveform.

At step 510, the method 500 may derive a measurement from the echo waveform. Example desirable measurements may include a distance measurement (e.g., distance from the tool to the borehole wall), an acoustic impedance measurement (e.g., determining formation firmness, or formation lithography therefrom), or a cement bond quality measurement (e.g., the quality of a cement bond on the exterior casing wall). Such measurements may be derived by a processor, possibly being arranged downhole with the tool string or within the tool itself.

FIG. 6 shows a workflow diagram 600 with certain illustrative waveforms. The work flow diagram includes three acquired waveforms 602a-c (shown as a first, second, and third acquired waveform 602a, 602b, and 602c, respectively) which are acquired within a close time period to each other. The acquired waveforms 602a-c may be representative of the waveform as measured by the acoustic transducer 302 of FIG. 3. Note the deterministic (i.e., consistently present) peak present near the beginning of each acquired waveform 602a-c. This peak is the result of ring down interference and it dominates over the echo signal measurements.

A statistical analysis using weighted averaging was performed on the acquired waveforms 602a-c to identify the deterministic waveform 604, here being a ring down waveform. As discussed herein, the deterministic waveform 604 may be identified through the relatively constant amplitude and phase portion of all the acquired waveforms 602a-c. Upon removing the deterministic waveform 604 from the acquired waveforms 602a-c, an echo waveform 606 is thereby generated. As depicted, the deterministic waveform 604 is removed from the second acquired waveform 602b, thereby resulting in the corresponding echo waveform 606 which no longer contains the initial large amplitude portion of the waveforms 602a-c. It will be appreciated by those of skill in the art that while three acquired waveforms 602a-c are depicted, use of more or less than three acquired waveforms 602a-c is contemplated herein to be used in determining the ring down waveform.

FIG. 7 shows another workflow diagram 700 with certain illustrative waveforms. In FIG. 7, an acquired waveform 702 (i.e., representative of the return waveform 306 of FIG. 3) is received by an acoustic transducer. The deterministic waveform 704 is pre-recorded from a model or statistical analysis prediction. Thus, by removing the deterministic waveform 704 from the acquired waveform 702, the echo waveform 706 results.

Figure 8:
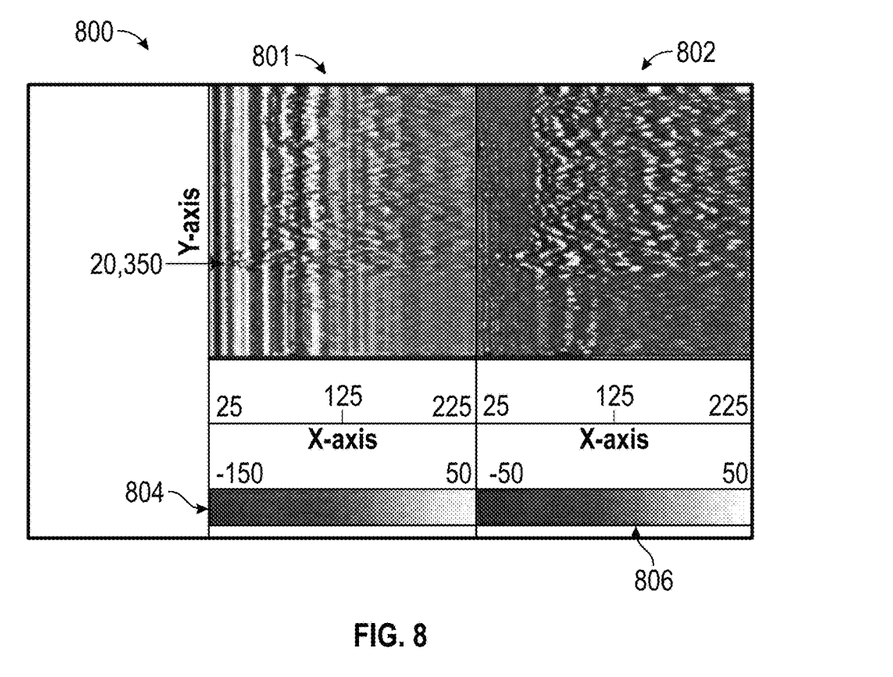
FIG. 8 depicts illustrative sonic logs with and without the disclosed processing techniques.

FIG. 8 depicts illustrative sonic logs with and without the disclosed processing techniques. More specifically, the sonic log 801 depicts a raw acquired acoustic waveform, such as the return waveform 306 of FIG. 3, while the sonic log 802 depicts the same acquired acoustic waveform with the deterministic waveform removed, i.e., the true echo waveform. The Y-axis represents borehole depth and the X-axis represents time. Note that the casing string terminates at 20350, yielding an open hole log below this point. The shading represents signal amplitude of the acquired waveform, ranging from dark (low amplitude) to light (high amplitude) in arbitrary units.

During operation, as previously mentioned, the deterministic waveform will often be of a larger amplitude and be first "received" by the acoustic transducer due to inherent remnant vibrations once the driver signal is removed. Thus, as can be seen on the sonic log 801, the large amplitude deterministic waveforms are first measured during the initial time period (i.e., from approximately 25 μsec to 75 μsec), and then smaller amplitude echo waveforms are received (i.e., from approximately 75 μsec to 225 μsec). However, after removal of the deterministic waveform, the sonic log 802 depicts a waveform where the initial signals (i.e., from approximately 25 μsec to 75 μsec) are absent until the actual echo signal is received by the acoustic transducer.

Similarly, the removal of the ring down signature enables the sonic log 802 signal amplitude scale 806 to now have a smaller range (from −50 to 50), substantially enhancing the contrast associated with the echo signal and thereby facilitating its analysis in both cased and open hole environments.

Numerous other modifications, equivalents, and alternatives, will become apparent to those skilled in the art once the above disclosure is fully appreciated. It is intended that the following claims be interpreted to embrace all such modifications, equivalents, and alternatives where applicable.

Embodiments disclosed herein include:

A: An acoustic range finding method, comprising deploying a tool downhole, transmitting a first acoustic waveform with a transmitting acoustic transducer of the tool, receiving a second acoustic waveform with a receiving acoustic transducer of the tool, removing a deterministic waveform from the second acoustic waveform to obtain an echo waveform, and deriving a measurement from said echo waveform.

B: An acoustic range finding system, comprising a wellbore, a tool arranged within the wellbore and having a transmitting acoustic transducer which transmits a first acoustic waveform and a receiving acoustic transducer which receives a second acoustic waveform, and a processor which removes a deterministic waveform from the second acoustic waveform, thereby resulting in an echo waveform.

C: A non-transitory computer-readable medium comprising computer executable instructions which, when executed by a process, implements a method comprising transmitting a first acoustic waveform with a transmitting acoustic transducer of a downhole tool, receiving a second acoustic waveform with a receiving acoustic transducer of the tool, removing a deterministic waveform from the second acoustic waveform to obtain an echo waveform, and deriving a measurement from said echo waveform.

Each of embodiments A, B, and C may have one or more of the following additional elements in any combination: Element 1: further comprising presenting the measurement to a user. Element 2: wherein the measurement is one of a distance, an acoustic impedance, or a cement bond quality. Element 3: wherein the transmitting acoustic transducer is also the receiving acoustic transducer and wherein the deterministic waveform is a ring down waveform. Element 4: further comprising estimating the deterministic waveform by performing a statistical analysis of other waveforms acquired in a time window around an acquisition time of the second acoustic waveform. Element 5: further comprising estimating the deterministic waveform by filtering the second acoustic waveform with a statistical low pass filter. Element 6: wherein the statistical low pass filter is a mean or median filter. Element 7: further comprising estimating the deterministic waveform by transforming the second acoustic waveform out of the time-domain, performing a statistical analysis on the transformed second acoustic waveform, and transforming the second acoustic waveform back to the time-domain. Element 8: wherein the deterministic waveform comprises a pre-recorded waveform or estimated waveform. Element 9: further comprising windowing the second acoustic waveform within a predetermined time window. Element 10: wherein deriving the measurement is performed by a downhole processor. Element 11: wherein deriving the measurement is performed by a processor at the surface.

Element 12: further comprising a user interface which displays a measurement corresponding to the echo waveform. Element 13: wherein the deterministic waveform is a ring down waveform. Element 14: wherein the transmitting and receiving acoustic transducers are the same transducer. Element 15: wherein the processor is arranged downhole. Element 16: wherein the tool is deployed downhole on a drill string. Element 17: wherein the tool is deployed on a wireline.

What is claimed is:

1. An acoustic range finding method, comprising:
   deploying a tool downhole;
   transmitting a first acoustic waveform with a transmitting acoustic transducer of the tool;
   receiving a second acoustic waveform with a receiving acoustic transducer of the tool;
   estimating a deterministic waveform by performing a statistical analysis of other waveforms acquired in a time window around an acquisition time of the second acoustic waveform;
   removing the deterministic waveform from the second acoustic waveform to obtain an echo waveform; and
   deriving a measurement from said echo waveform.

2. The method of claim 1, further comprising presenting the measurement to a user.

3. The method of claim 1, wherein the measurement is one of a distance, an acoustic impedance, or a cement bond quality.

4. The method of claim 1, wherein the transmitting acoustic transducer is also the receiving acoustic transducer and wherein the deterministic waveform is a ring down waveform.

5. The method of claim 1, further comprising estimating the deterministic waveform by filtering the second acoustic waveform with a statistical low pass filter.

6. The method of claim 5, wherein the statistical low pass filter is a mean or median filter.

7. The method of claim 1, further comprising estimating the deterministic waveform by:
   transforming the second acoustic waveform out of the time-domain;
   performing a statistical analysis on the transformed second acoustic waveform; and
   transforming the second acoustic waveform back to the time-domain.

8. The method of claim 1, wherein the deterministic waveform comprises a pre-recorded waveform or estimated waveform.

9. The method of claim 1, further comprising windowing the second acoustic waveform within a predetermined time window.

10. The method of claim 1, wherein estimating the deterministic waveform comprises identifying the deterministic waveform through a relatively constant amplitude and phase of multiple acquired waveforms.

11. The method of claim 1, wherein the deterministic waveform comprises a deterministic wave signature that is common across the other waveforms.

12. An acoustic range finding system, comprising:
    a tool arranged within a wellbore, the tool comprising,
       a transmitting acoustic transducer to transmit a first acoustic waveform; and
       a receiving acoustic transducer which receivesto receive a second acoustic waveform;
    a processor; and
    a machine-readable medium having program code executable by the processor to cause the processor to,
       estimate a deterministic waveform by performing a statistical analysis of other waveforms acquired in a time window around an acquisition time of the second acoustic waveform, and
       remove the deterministic waveform from the second acoustic waveform, thereby resulting in an echo waveform.

13. The system of claim 12, further comprising a user interface to display a measurement corresponding to the echo waveform.

14. The system of claim 12, wherein the deterministic waveform is a ring down waveform.

15. The system of claim 12, wherein the transmitting and receiving acoustic transducers are the same transducer.

16. The system of claim 12, wherein the deterministic waveform comprises a portion of the other waveforms having a relatively constant amplitude and phase.

17. The system of claim 12, wherein the deterministic waveform comprises a deterministic wave signature that is common across the other waveforms.

18. A non-transitory computer-readable medium comprising computer executable instructions which, when executed by a process, implements a method comprising:
    transmitting a first acoustic waveform with a transmitting acoustic transducer of a downhole tool;
    receiving a second acoustic waveform with a receiving acoustic transducer of the downhole tool;
    estimating a deterministic waveform by performing a statistical analysis of other waveforms acquired in a time window around an acquisition time of the second acoustic waveform;
    removing the deterministic waveform from the second acoustic waveform to obtain an echo waveform; and
    deriving a measurement from said echo waveform.

19. The non-transitory computer-readable medium of claim 18, wherein the deterministic waveform comprises a portion of the other waveforms having a relatively constant amplitude and phase.

20. The non-transitory computer-readable medium of claim 18, wherein the deterministic waveform comprises a deterministic wave signature that is common across the other waveforms.

* * * * *